United States Patent
Esmailzadeh et al.

(10) Patent No.: US 6,760,315 B1
(45) Date of Patent: Jul. 6, 2004

(54) INTERFERENCE CANCELLATION IN RADIO STATIONS

(75) Inventors: Riaz Esmailzadeh, Minami-Ku (JP); Jonas Karlsson, Marine (JP)

(73) Assignee: Telefonaktiebolaget LM Ericsson, Srockholm (SE)

(*) Notice: Subject to any disclaimer, the term of this patent is extended or adjusted under 35 U.S.C. 154(b) by 0 days.

(21) Appl. No.: 09/512,606

(22) Filed: Feb. 25, 2000

(30) Foreign Application Priority Data

Feb. 26, 1999 (SE) .............................................. 9900684

(51) Int. Cl.[7] .............................................. H04J 13/00
(52) U.S. Cl. ...................... 370/310; 370/342; 370/335
(58) Field of Search ....................... 370/310, 342–347, 370/335; 379/399.02; 455/63, 296, 302, 334, 501, 206

(56) References Cited

U.S. PATENT DOCUMENTS

| | | | | |
|---|---|---|---|---|
| 5,553,062 A | * | 9/1996 | Schilling et al. | 370/479 |
| 5,579,304 A | * | 11/1996 | Sugimoto et al. | 370/342 |
| 5,894,473 A | * | 4/1999 | Dent | 370/342 |
| 6,081,516 A | * | 6/2000 | Yoshida et al. | 370/342 |

FOREIGN PATENT DOCUMENTS

| EP | 0 849 886 A2 | 6/1998 |
|---|---|---|
| EP | 0 884 855 A1 | 12/1998 |

OTHER PUBLICATIONS

European Search Report dated Jan. 14, 2000.

\* cited by examiner

*Primary Examiner*—Huy D Vu
*Assistant Examiner*—Justin M. Philpott (57) ABSTRACT

The invention is concerned with a radio receiver station, a multi-user interference cancellation unit and a multi-user cancellation method in a system with several transmitting radio stations. In the method, a radio signal is received as a sum of the signals from at least two of the transmitting radio stations in the system. Interference from at least two of the transmitting radio stations is cancelled. The interfering signals from at least some of the transmitting radio stations are processed in at least two separate operations in one or more stages, the result of each separate operation being taken into consideration in the estimation of the desired modulated signal sent to the receiver. Preferably, a part of the interfering signals is processed in one of the separate operations, while the rest of the interfering signals are processed in the other separate operations. If the cancellation is carried out in more than one step, the cancellation results of the first cancellation stage are used in the second interference cancellation stage, the method being correspondingly continued in the possible further cancellation stages.

11 Claims, 5 Drawing Sheets

INTERFERENCE CANCELLATION IN RADIO STATIONS

TECHNICAL FIELD

The present invention is concerned with a method and apparatus for multiuser interference cancellation in a system comprising a radio base station serving several transmitting radio stations. The invention is also concerned with an interference cancellation unit for use in such systems.

DESCRIPTION OF RELATED ART

Radio transmission of information is carried out by modulation of a carrier wave and transmitting the modulated signal with a radio transmitter. The receiver demodulates the signal to reproduce the information sent. The demodulation and modulation techniques depend on the multiple access method used.

Different multiple access methods exist for the transmitting and receiving of the radio signals. In TDMA, Time Division Multiple Access, a channel consists of a time slot in a periodic train of time intervals over the same frequency. In FDMA, Frequency Multiple Access, a communication channel is a single radio frequency band. Interference with adjacent channels is limited by the use of band pass filters which only pass signal energy within the specified frequency band. In Code Division Multiple Access, CDMA, the signals can share the same frequency band and the CDMA receiver can also operate with several frequency bands at the same time. The selection, i.e. discrimination, between the desired signal and other signals is carried out by suitable signal processing, which is based on a spreading code used to modify the desired signal. All simultaneous connections use different codes.

In the CDMA system, the radio signal is received by an antenna and filtered so that signals of other frequencies would not interfere. The result is demodulated to a band-limited base band signal that can be fed to a base band processing unit to reproduce the transmitted digital data stream, which had been modulated by for example spread spectrum technique. In spread spectrum, radio signals are transmitted by expanding the bandwidth of the information signal by means of an independent code signal. The band spreading is achieved so that each fed information bit is replaced by a code sequence. If the receiver is authorized and has a syncronous code signal then the corresponding information signal can be despread and demodulated. One CDMA technique uses a signature sequence to represent one bit of information. The signature sequence comprises M bits and each bit is called a chip. The entire M-chip sequence is referred to as a transmitted symbol. The despreading code isolates the signals of the desired station and reduces the signals of other stations to noise.

Interference from the other transmitting radio stations served by the base station occur in all kind of radio receiver systems, such as CDMA, TDMA and FDMA systems mentioned above, as the antenna of the radio receiver system receives a radio signal, which is a combination of signals from some or all the transmitting radio stations (or mobile stations) in a cell or sector of a cell.

Even interference from mobile stations from other base stations might occur. There are methods, with which interference from such mobile station can be cancelled without knowledge about the transmitting mobile station. Such interference might be received by an antenna and demodulated, even though the detector will ignore them in a later stage.

In CDMA, it means that the demodulator of a CDMA receiver system produces a base band signal which is the sum of the base band signals from some or all of the transmitting radio stations. The number of radio stations that can share the same frequency band in CDMA is therefore limited by co-channel interference. Thus, there are several users on the same frequency band using different spreading codes which might interfer with each other In a cellular communications system, for example, such interference limits the number of mobile stations that can access the same base station. The communication quality decreases with an increased number of mobile stations. It is therefore preferable to take information of other interferring signals into consideration at the receiver in decoding the received signal to cancel co-channel interference in the radio receivers.

There are many different interference cancellation (IC) methods. In some of them the interference from other transmitting radio stations is calculated based on an estimate of its transmitted symbol, and the estimated interference is deducted from the total received signal. The interference might also be calculated on the basis of spreading sequences and time delays, for example using a decorrelating detector. All users' interference signals may be estimated in parallell, in which the estimates are refined over a number of stages; or in serial, where the user signals are ranked according to their reliability; or a hybrid combination of the serial and parallell methods. A description of parallell and serial interference cancellation methods can be found in "PERFORMANCE OF AN ADAPTIVE SUCCESSIVE SERIAL—PARALLELL CANCELLATION SCHEME IN FLAT RAYLEIGH FADING CHANNELS, Tik-Bin Oon, Raymond Steele and Ying Li, Department of Electronics and Computer Science, Univ. of Southampton, SOI17 1BJ, UK.

In the interference cancellation method of U.S. Pat. No. 5,579,304, the information of other users' signals is made use of so that one of the user signals of a base station is detected and the bandlimited signal is demodulated to reproduce the original. information signal. The signal thus produced is subtracted from the combined signal and the result signal gives information of the rest of the user signals. The following user signal is detected in a similar way and the corresponding subtraction is made from the result signal from the foregoing step. A new signal is produced in a similar way after processing of each user signal and the whole process can be repeated several times.

In the above methods, each interference-canceling stage generates estimated symbol values for the mobile stations, later stages refining the estimates of earlier stages. Each time a symbol value is thus estimated or re-estimated, corresponding information is removed from the base band signal.

If there are several users in the same base station, the method becomes very complex and difficult to implement. The number of necessary calculations for each of these methods is quite large and increases as the number of the serving base station's subscribers increases. Receiving of signals from other subscibers might also influence and should be taken into consideration.

In WCDMA (Wide band CDMA) systems, a large number of mobile users are served by one base station. The base station needs to process and receive all these users' signals; a task which is processing power consuming and very difficult to accomplish; The introduction of an interference cancellation unit to the system further complicates the task since now a significantly larger number of user signals would need to be processed at the receiver.

SUMMARY OF THE INVENTION

The object of the invention is to make the processing of interferring signals less complex in systems with a large number of mobile users.

It is therefore suggested, according to the present invention, to process the user signals separately in at least two operations.

The multiuser interference cancellation method of the invention is used in a radio receiver which receives signals within the range of the receiver in a system with several transmitting radio stations. Interference from other transmitting radio stations is cancelled so that a desired signal cleaned from interfering signals would be obtained. The transmitting radio stations use a particular multiple access method for transmitting modulated radio signals. The radio receiver receives a radio signal as a sum of the signals from at least two transmitting radio stations in the system. The radio signal is processed in accordance with the multiple access method used, whereafter interference is cancelled from at least some of the transmitting radio stations in the system from the radio signal. The desired modulated signal sent to the receiver is then estimated. The method of the invention is mainly characterized in that the interfering signals from at least some of the transmitting radio stations are processed in at least two separate operations in one or more stages, the result of each separate operation being taken into consideration in the estimation of the desired signal.

Preferably, a part of the interfering signals, constituting a group of user signals, is processed in one of the separate operations, while the rest of the interfering signals, constituting another group or other groups of user signals, are processed in the other separate operation(s).

If the cancellation is carried out in more than one step, the cancellation results of the first cancellation stage are used in the second interference cancellation stage, the method being correspondingly continued in the possible further cancellation stages.

The apparatus and the multi-user interference cancellation unit of the invention are mainly characterized in that the multi-user interference cancellation unit consists of at least two physical units, over which the interfering signals are processed in separate operations in one or more stages.

The interference cancellation is preferably carried out over two or more physical units, one for each group of user signals, with one or more information transmissions between the units, so that all or part of the estimated interference signals are deducted from the total received signal. A physical unit may comprise one receiver board or a part thereof.

To carry out information transmissions between the units, the units comprise means for transferring information, between the units, of the signals from transmitting radio stations.

In one embodiment of the invention, the interference cancellation carried out separately for two or more groups of user signals in at least one stage in each physical unit is carried out to achieve estimated interference signals from each separate operation, whereafter the estimated interference signals are deducted from the total received signal as a sum of total of user signals cancelled in each separate operation.

This embodiment can be carried out so that the estimated signal values are used in the next cancellation stages to further improve these values and the information transmission between the units consists of cleaned signals that are sent to the other units to be taken into consideration in the next cancellation stages.

In an alternative the embodiment of the invention, the information transmission between the units consists of total estimated interfering signals.

In another embodiment of the invention, the transmission between the units is in form of an output signal from each physical unit, consisting of a composite data stream which contains information about the users which were assigned to the unit in form of detected values of each users received data, the associated channel estimates, time delay estimates, spreading codes and such information and is sent to the other units so they can generate estimated values or similar values for the users in the other units for cancelling the associated interference from their assigned users.

Different interference cancellation methods can be used. In some of them the interference from the other transmitting radio stations in the system is calculated on the basis of the estimate of their transmitted symbols. The interference might also be calculated on the basis of spreading sequences and time delays, for example using a decorrelating detector. The interference cancellation methods used in the separate interference cancellation operations can be serial interference cancellation methods, parallel interference cancellation methods, or hybrid methods of these and they can be carried out with the same method or with different methods in the different units.

In the invention, the amount of inter-board communications for interference cancellation purposes is kept low without significantly affecting the IC performance.

Hardware is used for implementation of the interference cancellation method of the invention, which allows the functions to be performed over two or more physical receiver units. Associated hardware is used at the base station for implementing the method.

The range of the receiver in a system with several transmitting radio stations within which radio signals are received is mainly the one served by the base station, but the reciever might also receive signals from mobile stations served by other base stations.

The method can be used in FDMA, TDMA and CDMA systems and is especially useful in all types of CDMA systems, including WCDMA. The invention has an other advantage in that a pool of receiver boards each containing one or more of said physical units, can exist at the base station and can be assigned to a particular sector as traffic loads vary within the cell.

The invention will now be described by means of the following figures, which presents examples of different advantageous embodiments of the invention. The invention is not restricted to the details of the text and figures, as the details of the invention can vary within the scope of the claims.

DETAILED DESCRIPTION OF THE DRAWINGS

Figure 1:
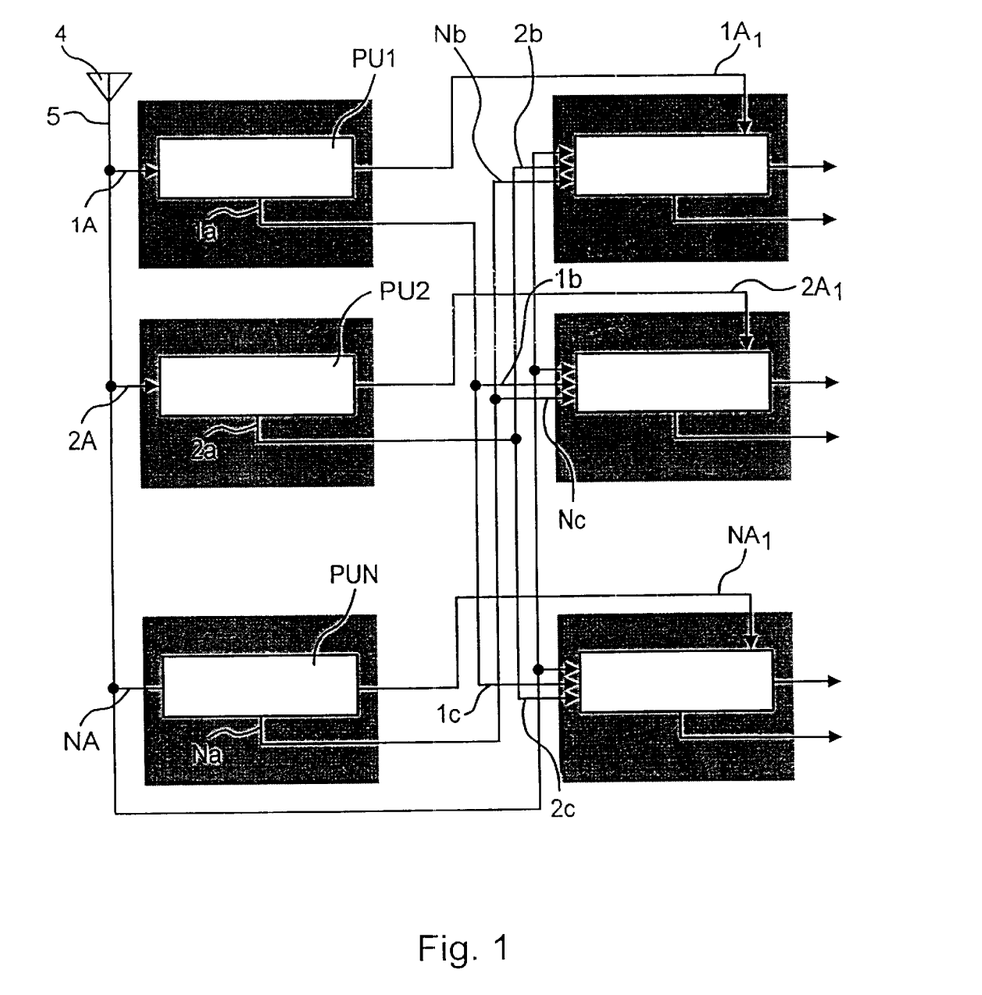
FIG. 1 is a schematic view of the partitioned IC method of the invention.

The partitioned IC method of the invention is generally illustrated in FIG. 1 in connection with a CDMA receiver. All users within a cell (or a sector of a cell) are divided into N groups. The receiver at the base station receives a CDMA signal through an antenna 4. The demodulator (not illustrated) of the receiver system produces a base band signal which is the sum of the base band signals from transmitting mobile stations belonging to the cell or sector of a cell served by the base station. The combined signal might include signals from transmitting radio stations belonging to other base stations. The base band signals are sent to the physical units PU1, PU2, PUN which is illustrated with the arrows 5, 1A, 2A, NA. The receiver performs the IC function for each group of user signals on the separate physical units, PU1, PU2 . . . PUN, which may be separate electronic boards or parts thereof.

After that the first stage of IC function has been carried out in the physical units PU1, PU2, PUN, the physical units output information to the other units (in FIG. 1, PU1 sends information to PU2 and PUN, PU2 sends information to PU1 and PUN and PUN sends information to PU1 and PU2). This information is used in the next stages of the IC cancellation of the other units. This is illustrated in FIG. 1 by the arrows 1a, 1b, 1c, 2a, 2b, 2c and Na, Nb, Nc. The output signals 1A1, 2A1 and NA1 represent the signal estimated for users of group 1,2,N, respectively, which in the next cancellation stage 2 are used to further improve the estimated signal values.

Blocks PU1, PU2, and PUN represent the IC units, in which the actual interference cancellation of the user signals in group 1,2, and N, respectively, takes place. Different methods of interference cancellation may be used in the units. For example, in a serial cancellation method, a CDMA signal is received and converted to a base band signal by filtering out the signals of the actual frequency band/bands. The user signals handled in the intereference cancellation in every physical unit can be ranked according to their reliability, which might be based on the received signal strength. The transmitting mobile stations belonging to the same CDMA communication system employs the same type of carrier signal and carrier frequency but each using a different spreading code. The receiving base station thus receives a signal in which the signals of different mobile stations, spread by different spreading codes have been additively combined. An estimated symbol value is obtained for the first user to be cancelled by using the base band signal and the despreading code of the first user. An interference signal is estimated by using the user specific code. The base band signal is modified by subtracting from it the interference signal of the first user obtained. The result is a modified base band signal from which interference from the first user signal has been cancelled. This result base band signal is used in the cancellation of the user signal which is ranked next and so on until the last cancellation to be carried out on the physical unit is done and the weakest signal is obtained and subtracted from the foregoing base band signal with a cleaned signal as a result. Corresponding interference cancellations are carried out on the physical units for each user signal group.

The interference cancellation may take place in many stages to obtain better and better results. In that case, after each interference cancellation stage, information transfer takes place between the physical units so that the cancellation carried out in a given physical unit is taken into consideration in the estimation of the base band signal on the other units and vice versa.

Figure 2:
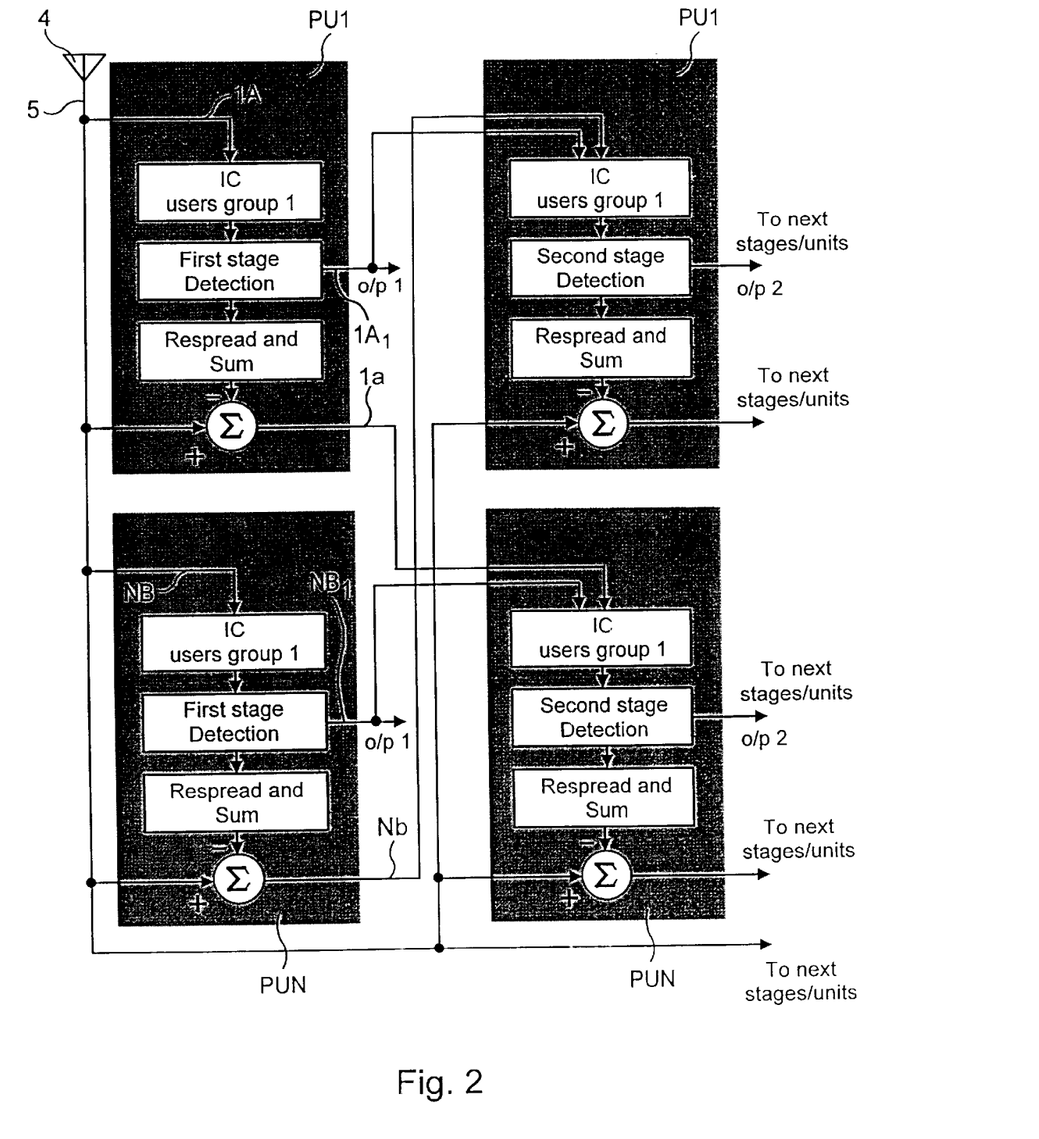
FIG. 2 is a schematic view of an embodiment of the invention

FIG. 2 is a schematic view of an embodiment of the invention. The signal received by the antenna 4 is converted to a base band signal and sent (arrow 5) to the physical units PU1, PUN, where it is cleaned from interference of all those users which are assigned to the physical unit PU1, PUN and the cleaned signal is passed to the other units, which is illustrated with arrows 1a, Nb. The output signals 1A1, NB1 represent the detected symbol values, which in the next cancellation stage 2 are used to further improve the estimated values.

The cancellation can be carried out as many times as wished on each board.

Figure 3:
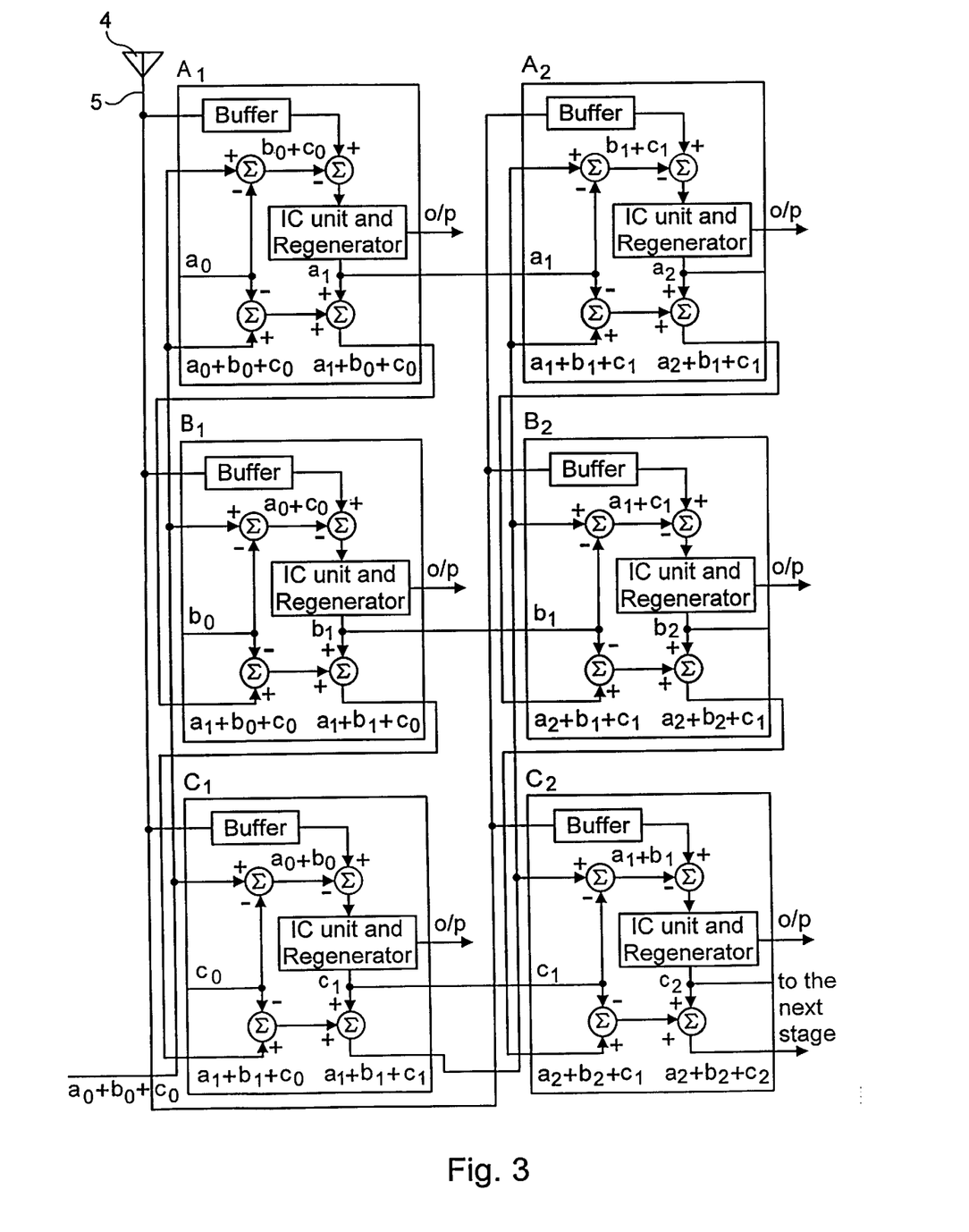
FIG. 3 is a detailed example of another embodiment of the invention

A detailed example of another embodiment of the invention is illustrated in FIG. 3 for an implementation over 3 IC units, A, B, C. The signal flow between the boards is denoted by small letters a, b, c; with subsripts denoting the stage at which the signal has been generated (stage 0 is non existant, i.e. $a_0 = b_0 = c_0 = 0$, but inputs $a_0$, $b_0$, and $c_0$ have been shown regardless to have a consistent diagram for all the various stages shown in FIG. 3.

A CDMA signal is received through the antenna 4 and is sent to the receiver station, which is illustrated with arrow 5. The buffer block receives real-time data from the antenna. The detection and signal processing is performed in a block-wise batch mode. The buffer block stores the data needed for each of these block-wise detections. In the first cancellation stage 1 carried out in the first physical unit A, the original interferring signals $b_0 + c_0$ of user groups b and c are cancelled and a better base band signal $a_1$ can be used in interference cancellation stage 2. A total estimated interfering signal $a_1 + b_0 + c_0$, as a result of the interference cancellation stage 1 carried out in physical unit A is passed to the second physical unit B. The first cancellation stage 1 is carried out in a corresponding way in the physical units B and C. The original interferring signals $a_0 + c_0$ are cancelled in unit B and the original interferring signals $b_0 + a_0$ in unit C. Better base band signals $b_1$ and $c_1$ can be used in cancellation stage 2. A total estimated interfering signal $a_1 + b_1 + c_0$ as a result of the interference cancellation stage 1 of both the physical units A and B is passed to the third physical unit C. A total estimated interfering signal $a_1 + b_1 + c_1$ as a result of the interference cancellation stage 1 of all three units A,B and C is passed to cancellation stage 2 to be carried out in unit A. In cancellation stage 2, the cancellation steps of cancellation stage 1 are repeated by means of the new signals. (Note that there are only the units A,B and C in the figure. The numbers indicate the stage of cancellation carried out in that unit.)

Figure 4:
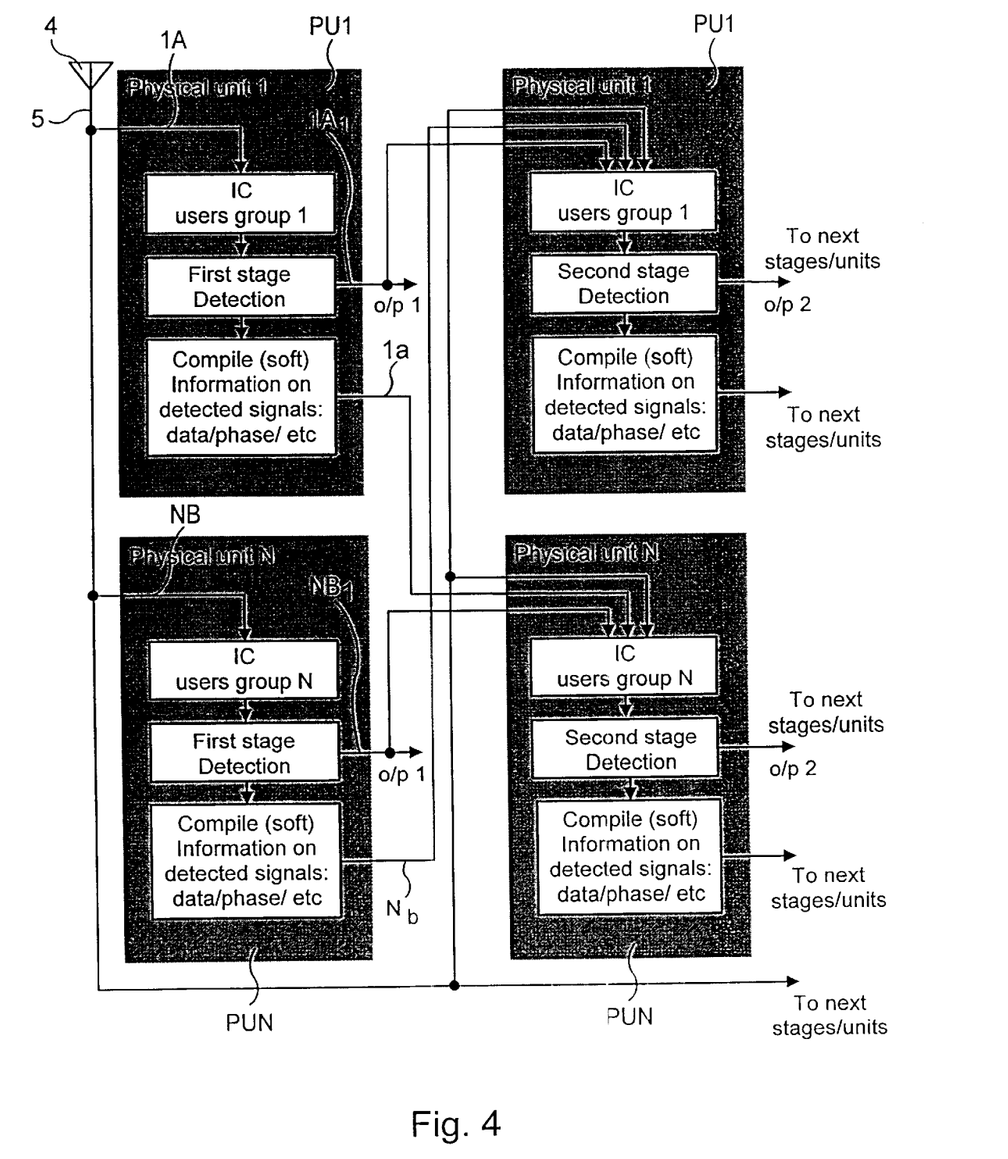
FIG. 4 is a schematic view of still another embodiment of the invention

Still another embodiment of the invention is shown in FIG. 4. Here the output signal from the IC physical unit, is a composite data stream which contains information about the users which were assigned to the unit. This information consists of detected values of each users received data, the associated channel estimates, time delay estimates, spreading codes and such information. The above information is used in the other units so they can generate cross-correlation values or similar values for cancelling the associated interference from their assigned users.

Figure 5:
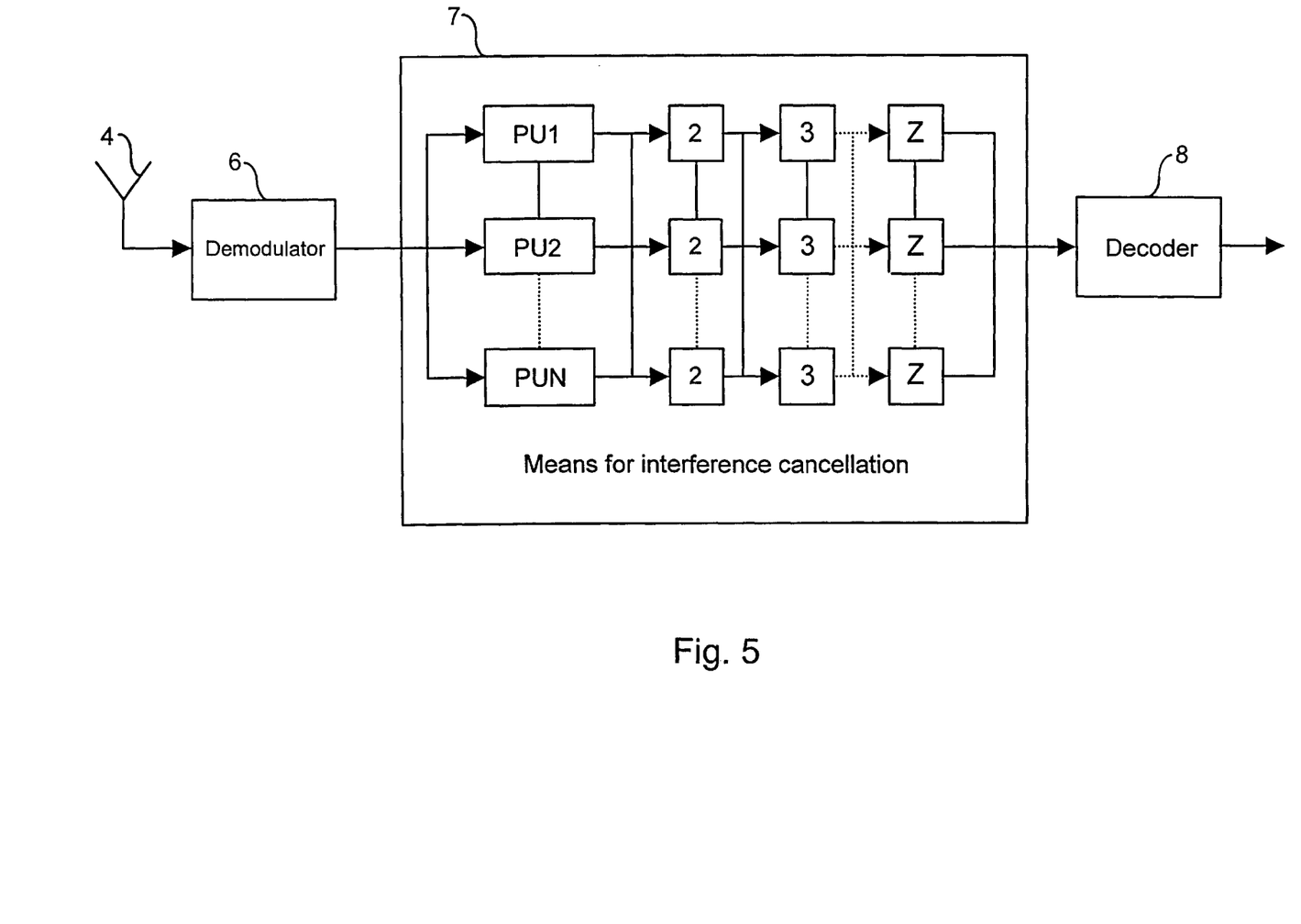
FIG. 5 is a block diagram presentation of the radio receiver station of the invention.

FIG. 5 is a block diagram presentation of the radio receiver station of the invention. Radio signals, for example CDMA signals, are received through an antenna 4. The demodulator 6 of the radio receiver station produces a base band signal which is the sum of the base band signals from all the transmitting mobile stations belonging to the cell or a sector of a cell or to several cells. The users are divided into N groups. The base band signal is sent to a base band processor 7, which constitutes means for interference cancellation and represents the multiuser interference cancellation unit of the invention. The multiuser interference cancellation unit 7 comprises physical units PU1, PU2, . . . PUN for cancellation of interference in a way according to the invention. More in detail, the base band signal is sent to physical units PU1, PU2, PUN. The interference cancellation is carried out on separate physical units, PU1, PU2 . . . PUN for each group. The physical units may be separate electronic boards or parts thereof. After that the first stage of IC function has been carried out in the physical units PU1, PU2, PUN, the physical units output information to the other units and the interference cancellation can be carried out in several stages in a way according to the invention this information being used in the next stages of the IC cancellation of the other units, which is illustrated by interference cancellation numbers 2,3 . . . Z in FIG. 5. The lines between the units illustrate the information transmissions between them as explained in connection with the other figures. The final estimated modulated signals are sent to the decoder 8 which decodes them to reconstruct the information sent to the radio receiver of the system.

What is claimed is:

1. In a radio receiver, a method of estimating a desired modulated signal received by the receiver, by canceling interference from a plurality of signals received from a plurality of transmitting radio stations, said transmitting radio stations simultaneously transmitting modulated radio signals using a multiple access method, said method comprising the steps of:

receiving a radio signal that comprises a sum of the plurality of signals transmitted by the plurality of transmitting radio stations;

demodulating the received signal to form a base band signal that comprises a sum of the base band signals of each of the plurality of transmitting radio stations;

dividing the base band signal into a plurality of divided base band signals, wherein each of the divided base band signals includes desired base band signals from different channels from a corresponding group of transmitting radio stations;

separately processing each of the divided base band signals to isolate and cancel interference from at least some of the transmitting radio stations in each base band signal's corresponding group of transmittng radio stations, said processing step being performed in a separate interference cancellation unit for each divided base band signal, and being performed In accordance with the multiple access method utilized by the transmitting radio stations, said processing step producing post-processing information and an estimated modulated signal for the unit's corresponding group of transmitting radio stations;

providing the post-processing information from each of the separate interference cancellation units to each of a plurality of next-stage processors corresponding to each of the interference cancellation units;

providing the estimated modulated signal for each group of transmitting radio stations to the next-stage processor corresponding to the group's interference cancellation unit; and estimating the desired modulated signal received by the receiver by utilizing the post-processing information to enhance processing in the next-stage processors.

2. The method of claim 1, further comprising the steps of:
providing improved post-processing information from each of the next-stage processors to each of a plurality of further-stage processors corresponding to each of the next-stage processors;

estimating in each next-stage processor, an improved modulated signal for the processor's corresponding group of transmitting radio stations;

providing the estimated improved modulated signal for each group of transmitting radio stations to the further-stage processor corresponding to the group's next-stage processor; and estimating the desired modulated signal received by the receiver by utilizing the improved post-processing information to enhance processing in the further-stage processors.

3. The method of claim 1, wherein the step of separately processing each of the divided base band signals includes deducting at least some of the estimated interference signals from the desired modulated signal received by the receiver.

4. The method of claim 3, wherein the step of separately processing each of the divided base band signals includes canceling interference in multiple operations in each interference cancellation unit to achieve estimated interference signals from each separate operation, whereafter the estimated interference signals are deducted from the signal received by the receiver as a sum of signals canceled in each separate operation.

5. The method of claim 1, wherein the post-processing information includes cleaned signals that are sent to the next-stage processors to enhance processing therein.

6. The method of claim 1, wherein the post-processing information includes total estimated interfering signals that are sent to the next-stage processors to enhance processing therein.

7. The method of claim 1, wherein the post-processing information provided from each interference cancellation unit includes information about the transmitting radio stations in the unit's group of transmitting radio stations, said radio station information including detected values of each station's received data, associated channel estimates, time delay estimates, and spreading codes.

8. The method of claim 1, wherein the step of separately processing each of the divided base band signals includes canceling interference from at least some of the transmitting radio stations using operations selected from serial interference cancellation methods, parallel interference cancellation methods, and hybrid serial/parallel cancellation methods.

9. The method of claim 1, wherein the multiple access method used is Code Division Multiple Access (CDMA).

10. A radio receiver station for use in a network having a plurality of transmitting radio stations using a multiple access method for sending information in modulated radio signals, said radio receiver station comprising:

an antenna for receiving a radio signal that comprises a sum of the plurality of signals transmitted by the plurality of transmitting radio stations;

a demodulator for demodulating the received signal to form a base band signal that comprises a sum of the base band signals of each of the plurality of transmitting radio stations;

a multi-user interference cancellation unit for canceling interference from at least some of the transmitting radio stations, said multi-user interference cancellation unit comprising:

a signal divider for dividing the base band signal into a plurality of divided base band signals, wherein each of the divided base band signals includes desired base band signals from different channels from a corresponding group of transmitting radio stations; and a plurality of physical processing units for separately processing each of the divided base band signals to isolate and cancel interference from at least some of the transmitting radio stations In each base band signal's corresponding group of transmitting radio stations, wherein each processing unit processes one of the divided base band signals in accordance with the multiple access method utilized by the transmitting radio stations, and produces post-processing information and an estimated modulated signal for the unit's corresponding group of transmitting radio stations;

a plurality of next-stage processors, each of which corresponds to one of the physical processing units, said next-stage processors estimating the desired modulated signal received by the receiver, wherein each next-stage processor receives the post-processing information from each of the separate physical processing units, receives an estimated modulated signal from the next-stage processor's corresponding physical processing unit, and utilizes the post-processing information to enhance processing of the estimated modulated signal in the next-stage processor; and a decoder for reproducing the information received in the modulated signal estimated after cancellation of the interference.

11. The radio receiver station of claim 10, wherein the receiver station is a Code Division Multiple Access (CDMA) station.

* * * * *